(12) United States Patent
Neufeld et al.

(10) Patent No.: US 9,584,731 B2
(45) Date of Patent: Feb. 28, 2017

(54) CAMERA SYSTEM CONTROL FOR CORRECTING BORE-SIGHT OFFSET

(71) Applicant: Avigilon Corporation, Vancouver (CA)

(72) Inventors: Peter Wai Neufeld, Vancouver (CA); Sina Afrooze, Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 15/217,484

(22) Filed: Jul. 22, 2016

(65) Prior Publication Data

US 2016/0330382 A1 Nov. 10, 2016

(30) Foreign Application Priority Data

Nov. 29, 2013 (AU) ................................ 2013905102

(51) Int. Cl.
*H04N 5/232* (2006.01)

(52) U.S. Cl.
CPC ..... *H04N 5/23296* (2013.01); *H04N 5/23203* (2013.01); *H04N 5/23212* (2013.01); *H04N 5/23293* (2013.01)

(58) Field of Classification Search
CPC ............................ H04N 5/232; H04N 5/23296
See application file for complete search history.

(56) References Cited

U.S. PATENT DOCUMENTS

| | | | |
|---|---|---|---|
| 5,101,278 A | 3/1992 | Itsumi et al. | |
| 5,359,363 A | 10/1994 | Kuban et al. | |
| 5,486,860 A * | 1/1996 | Shiokawa | H04N 5/23212 348/347 |
| 5,835,641 A | 11/1998 | Sotoda et al. | |
| 7,262,812 B2 | 8/2007 | Burke | |
| 7,450,165 B2 | 11/2008 | Ahiska | |
| 7,729,602 B2 * | 6/2010 | Janson, Jr. | G03B 15/00 348/218.1 |
| 8,170,277 B2 * | 5/2012 | Michimoto | G06K 9/32 348/169 |
| 8,243,135 B2 | 8/2012 | Ahiska | |
| 8,243,807 B2 | 8/2012 | Yokoyama et al. | |
| 9,420,187 B2 | 8/2016 | Neufeld et al. | |
| 2001/0046309 A1 * | 11/2001 | Kamei | G06T 7/2053 382/103 |
| 2003/0103648 A1 * | 6/2003 | Ito | G06T 7/204 382/103 |
| 2009/0185033 A1 * | 7/2009 | Nozaki | H04N 5/23219 348/77 |
| 2010/0157107 A1 * | 6/2010 | Iijima | H04N 5/232 348/240.99 |
| 2011/0013031 A1 * | 1/2011 | Miyasako | G02B 27/646 348/208.99 |
| 2013/0155290 A1 * | 6/2013 | Huang | H04N 5/23296 348/240.1 |

(Continued)

*Primary Examiner* — Amy Hsu (74) *Attorney, Agent, or Firm* — Klarquist Sparkman, LLP (57) ABSTRACT

A camera system is provided that provides a smooth and centered zoom, even at high levels of magnification. The camera system corrects for misalignment between the optical axis of a lens and center of an image sensor. As a result of the misalignment, the center of an image will move during a zoom movement. The current camera system corrects for the misalignment as the zoom movement occurs. The correction is matched to the speed of the zoom in order to provide a fluid zoom movement.

31 Claims, 10 Drawing Sheets

(56) References Cited

U.S. PATENT DOCUMENTS

2013/0169820 A1* 7/2013 Stewart .................. H04N 5/225
                                                    348/169
2013/0222651 A1* 8/2013 Kagei .................... H04N 5/262
                                                    348/240.3
2015/0156422 A1  6/2015 Neufeld et al.

* cited by examiner

CAMERA SYSTEM CONTROL FOR CORRECTING BORE-SIGHT OFFSET

CROSS REFERENCE TO RELATED APPLICATION

This application is a Continuation of U.S. patent application Ser. No. 14/106,538, entitled "CAMERA SYSTEM CONTROL FOR CORRECTING BORE-SIGHT OFFSET", filed Dec. 13, 2013, which application claims priority to Australian Patent Application No. 2013905102, filed Nov. 29, 2013.

TECHNICAL FIELD

The current application is directed to controlling a camera system, and in particular to controlling a camera system in order to correct for bore-sight offset while performing a zoom movement.

BACKGROUND

Digital camera systems may include a lens for focusing an image onto an image sensor. Often lenses are composed of several optical elements. Some of the optical elements of the lens may be movable relative to the lens body, which results in optical characteristics of the lens being changed. For example, in varifocal lenses, changing the position of some of the optical elements results in a change in the focal length of the lens as the image is zoomed in or out.

The control of zooming in and out may be accomplished in various ways depending upon the camera system. In security cameras or other video cameras used to remotely survey a location, the camera system, including the zoom level, may be controlled. In addition to the zoom control, camera systems may also include additional positioning motors for adjusting a direction the camera system points in. These positioning motors may include a pan motor and a tilt motor. Typically, cameras with these motors may be referred to as pan, tilt and zoom (PTZ) cameras. When zooming in on a specified location, a user expects the zoom movement to be centered. That is, it is expected that a center point in the zoomed-out image will also be centered in the zoomed-in image. However, the image sensor may not be perfectly aligned with the optical axis of the lens and as such, as the image is zoomed in or out, the image will become un-centered and the user experiences an image shift.

Figure 1:
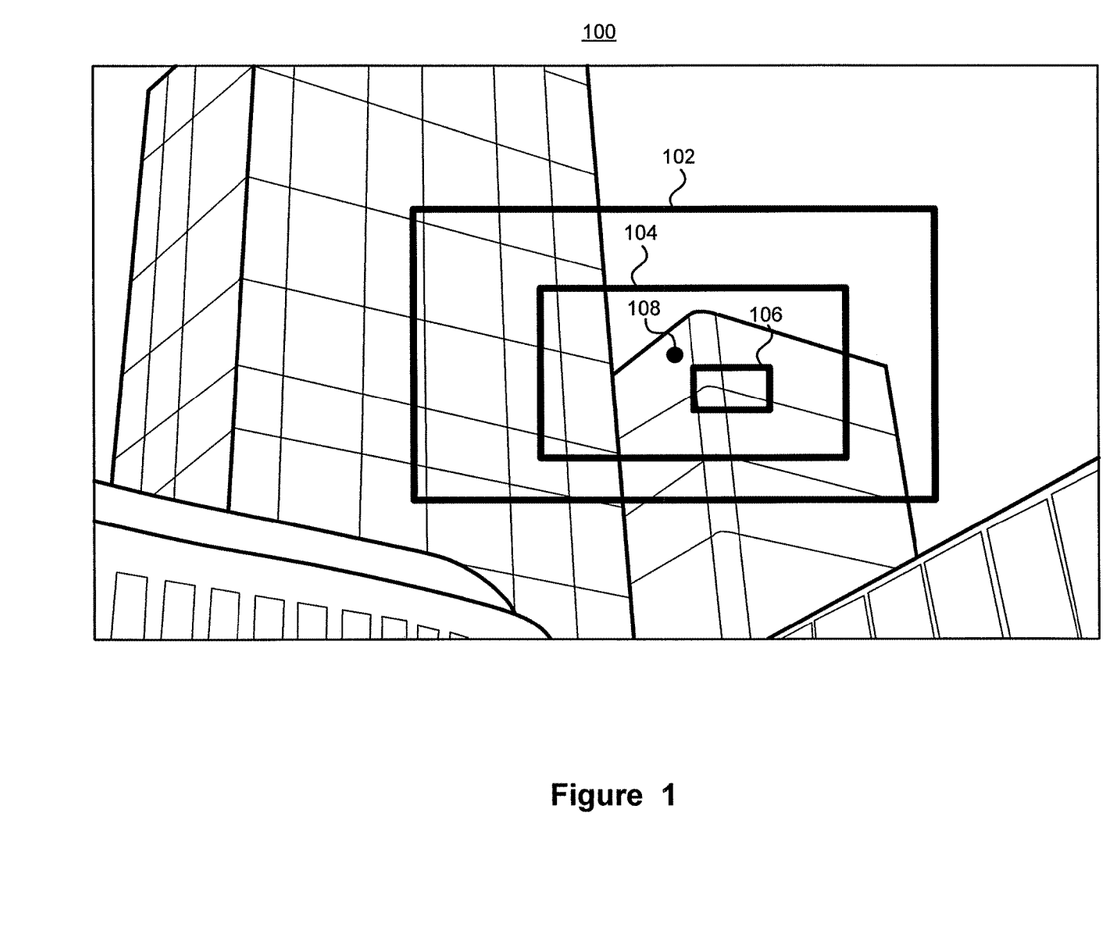
FIG. 1 depicts a scene that may be captured by a camera system.

FIG. 1 depicts a scene that may be captured by a camera system. As depicted, a city scene 100 is captured at different magnification levels, as depicted by field of view rectangles 102, 104, 106. As depicted, when the scene is captured at a first magnification level 102, the center of the field of view, represented by circle 108 is centered within the field of view 102. As the image is zoomed-in to a second magnification level 104, the circle 108 is no longer centered. As the image is zoomed in further 106, the error becomes more detectable and may result in the point 108 being completely outside of the field of view 106. The offset between the center of the image when completely zoomed out (i.e. wide end of the lens) and the center of the image when completely zoomed in (i.e. telephoto end of the lens) is called the "bore-sight offset" of the imaging module.

Figure 2:
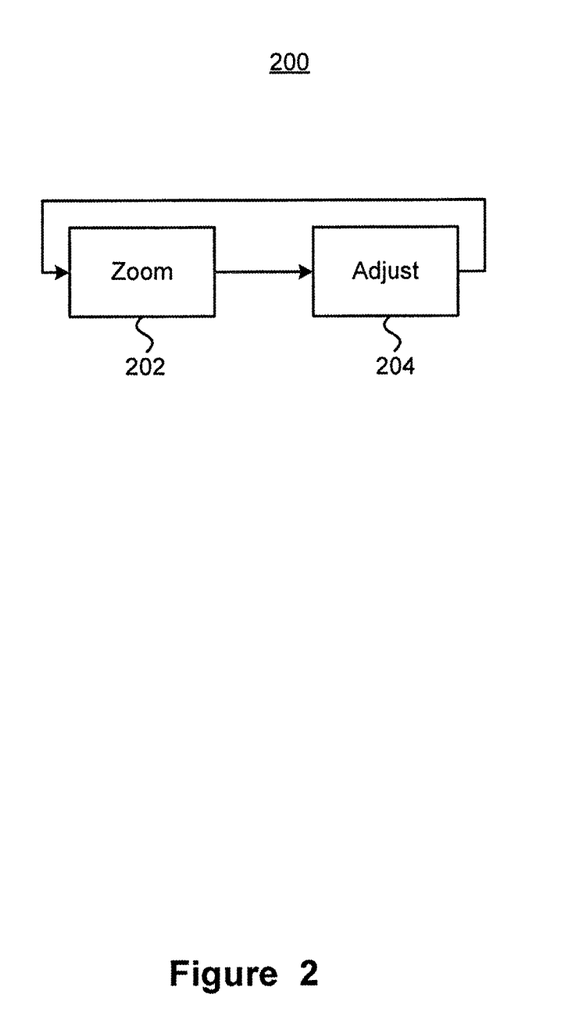
FIG. 2 depicts an existing adjustment scheme used to correct for bore-sight offset error.

Camera systems may attempt to correct for this error. FIG. 2 depicts an existing adjustment scheme used to correct for bore-sight offset error. As depicted, previous correction techniques 200 zoomed into the image (202) and then subsequently adjusted the positioning of the field of view (204) to correct for the offset error resulting from the zoom movement that was performed. While the final positioning using this technique may center the zoomed-in image correctly, the image will first be zoomed in followed by repositioning. Accordingly, the zooming process may not be fluid and the user experience is not ideal.

It is desirable to have an additional, alternative and/or improved camera system control to correct for bore-sight offset error.

BRIEF DESCRIPTION OF THE DRAWINGS

These and other features, aspects and advantages of the present disclosure will become better understood with regard to the following description and accompanying drawings wherein.

DETAILED DESCRIPTION

In accordance with the present disclosure there is provided a method of controlling a camera system to perform a zoom movement comprising: receiving zoom information for performing a zoom movement; determining zoom speed information of the camera system; and moving a displayed field of view of the camera system at a positioning speed based on the determined zoom speed information to correct for a bore-sight offset of the camera system as the zoom movement is performed.

In accordance with the present disclosure there is further provided a camera system comprising: a lens; an image sensor; and a processor for executing instructions stored in memory, the instructions when executed by the processor configuring the camera system to perform a method of controlling the camera system to perform a zoom movement comprising: receiving zoom information for performing a zoom movement; determining zoom speed information of the camera system; and moving a displayed field of view of the camera system at a positioning speed based on the determined zoom speed information to correct for a bore-sight offset of the camera system as the zoom movement is performed.

In a further embodiment, the zoom speed information provides an indication of a rate of change in lens magnification for zoom positions between a completely zoomed-out position and a completely zoomed-in position.

In a further embodiment, the positioning speed is determined to move the displayed field of view a required amount to correct for the bore-sight offset while the zoom movement is performed.

In a further embodiment, the zoom movement is performed by moving optical elements of a lens of the camera system.

In a further embodiment, the position of the displayed field of view of the camera system is adjusted using at least one positioning motor.

In a further embodiment, the at least one positioning motor comprises at least a pan motor and a tilt motor.

In a further embodiment, the position of the displayed field of view is adjusted to compensate for the bore-sight offset resulting from a zoom movement amount determined from the zoom information.

In a further embodiment, the method further comprises adjusting the positioning speed at which the displayed field of view of the camera system is moved as the zoom movement is performed.

In a further embodiment, the positioning speed is adjusted to match a current speed of the zoom movement based on the zoom speed information.

In a further embodiment, the zoom speed information provides a plurality of linear segments approximating a non-linear relationship between zoom position and zoom speed.

In a further embodiment, adjusting the positioning speed comprises: determining that a current zoom position is associated with a next linear segment of the zoom speed information; calculating a bore-sighting speed based on the zoom speed of the next linear segment and the bore-sight offset of the camera system; and adjusting the positioning speed to equal the bore-sighting speed to correct for the bore-sight offset.

In a further embodiment, the zoom speed information is provided as a lookup table allowing a zoom speed to be looked up based on a zoom position.

In a further embodiment, the zoom speed information provides a non-linear relationship between zoom position and zoom speed.

In a further embodiment, receiving zoom information comprises receiving an indication of a desired final zoom position.

In a further embodiment, receiving zoom information comprises receiving an indication of a zoom motor speed to apply.

In a further embodiment, the displayed field of view comprises a region of interest in a larger field of view captured by the camera system.

In a further embodiment, moving the displayed field of view comprises translating the region of interest within the larger field of view captured by the camera system.

In a further embodiment, the positioning speed is adjusted to match a current bore-sighting speed to correct for the bore-sight offset.

Camera systems such as security cameras, traffic cameras or other cameras used to view a scene remotely, may include functionality for controlling a zoom movement, or magnification level, the scene is captured at. Additionally, the camera system may include functionality for controlling the positioning of the field of view. For example, the camera system may include positioning motors that can adjust the vertical and horizontal directions the camera is pointed in. Alternatively, the positioning of the camera may be accomplished without changing the physical positioning of the camera, but rather by adjusting a position of a displayed region of interest within a larger scene captured by the image sensor. Regardless of how the camera system provides for adjusting the position of the field of view, it may be possible to move a displayed field of view as if the camera were physically repointed. As described with reference to FIG. 1, when the camera system zooms in, the position of the image may be offset from an expected position. The bore-sight offset error results from a misalignment of the lens's optical axis and the center of the image sensor. Although this misalignment may be reduced or eliminated during manufacture, the cost for doing so increases as the alignment error goes to zero. As described further herein, the camera system may include functionality for correcting for the bore-sight offset error. The correction of the bore-sight offset is performed while the zoom movement is occurring. As such, the camera system can provide a smooth zoom movement that maintains the same center of the image even at high magnification levels, such as at 5×, 10×, 20× or more. The smooth and centered zoom provided by the camera system described herein may provide an improved, or at the least alternative, user experience when zooming.

Figure 3:
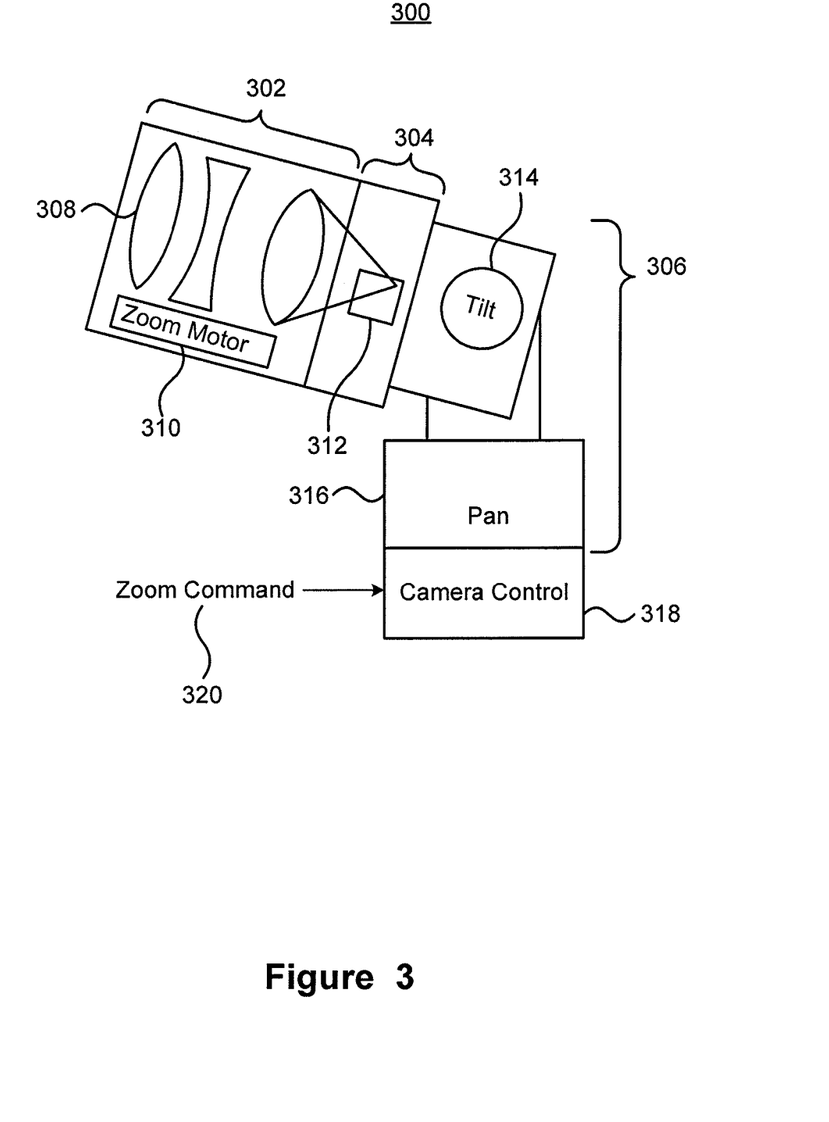
FIG. 3 depicts a PTZ camera system capable of correcting for bore-sight offset error.

FIG. 3 depicts a PTZ camera system capable of correcting for bore-sight offset error. The camera system 300 comprises a lens system 302 capable of zooming in and out and electronics 304 for capturing images. The electronics 304 include an image sensor 312 as well as other circuitry required by the image sensor. The camera system 300 further comprises a mounting platform 306 that is capable of repositioning the direction the camera is pointed. Although depicted as being provided by pan and tilt motors, the PTZ camera may provide pan and tilt positioning of the displayed field of view in other ways. Regardless of how the positioning of the displayed field of view is provided, the speed at which the displayed field of view can be repositioned should be able to keep up with the speed of bore-sighting which is linearly proportional to the magnification speed, which in turn is a nonlinear function of the zoom speed of the camera. If the displayed field of view cannot be repositioned quickly enough relative to the speed of bore-sighting, the camera system will not be able to correct for the bore-sight offset while the zoom movement occurs.

The lens system 302 includes a number of optical elements that can be repositioned by a zoom and/or focus motor 310. Changing the position of individual optical elements results in a magnification of the image, either zooming in or zooming out. However, if as depicted in FIG. 3 the image sensor 312 and the optical axis of the lens 302 are misaligned, the zoomed-in image will be offset from a desired or expected location.

The mounting platform 306 may include a tilt motor 314 and a pan motor 316. The tilt motor 314 may adjust the positioning of the camera along a first axis, while the pan motor 316 may adjust the positioning of the camera along a second axis, which may be orthogonal to the first axis. For example, the tilt motor 314 may adjust a vertical direction of the camera and the pan motor 316 may adjust a horizontal direction of the camera. Although depicted as pan and tilt motors, it is contemplated that other motors may be used in adjusting the positioning of the camera. Alternatively, the pan and tilting may be done digitally without any motors, by moving a region of interest (ROI) within the sensor space. It is also contemplated that the panning and tilting may be accomplished using a combination of one or more motors and moving of an ROI.

The camera system 300 may further comprise camera control functionality 318. The camera control functionality 318 may be implemented within a processor or microcontroller of the camera system 300 and may receive zoom commands 320 from a control system such as a computer in a remote location. Alternatively, the camera control functionality may be provided by a remote computer system, or locally by buttons or other controls on the camera itself. As described further below, the camera control functionality corrects for the bore-sight offset while the camera is zoomed in and/or out.

As described above with reference to FIG. 2, one technique for correcting the bore-sight offset is to zoom in or out and then adjust the positioning in order to correct for any offset resulting from the zoom movement. However, even if the zoom movement and adjustments are performed as a number of steps, the correction may still suffer from a number of problems. If the camera is streaming video, a slight lag in the offset compensation may be apparent. This lag may be more noticeable if the zoom motor is fast. Because the positioning motors compensate for the bore-sight offset error after it has affected the image, the result is a slightly skewed zooming effect. The center of the original full image is still centered at the end of the zoom movement, but during the movement it will be offset somewhat. Further, the video may have noticeable lateral jittering. This occurs when the zoom motor moves in one fluid motion, but the positioning motors that compensate for the bore sighting offset error move in small rapid adjusting movements to correct for zoom movement amounts that have just occurred. Because the positioning motors alternate between stationary and moving, their movement over the duration of a movement correcting for a bore-sight offset error is not continuous, and so the correction does not produce a fluid motion of the image.

Figure 4:
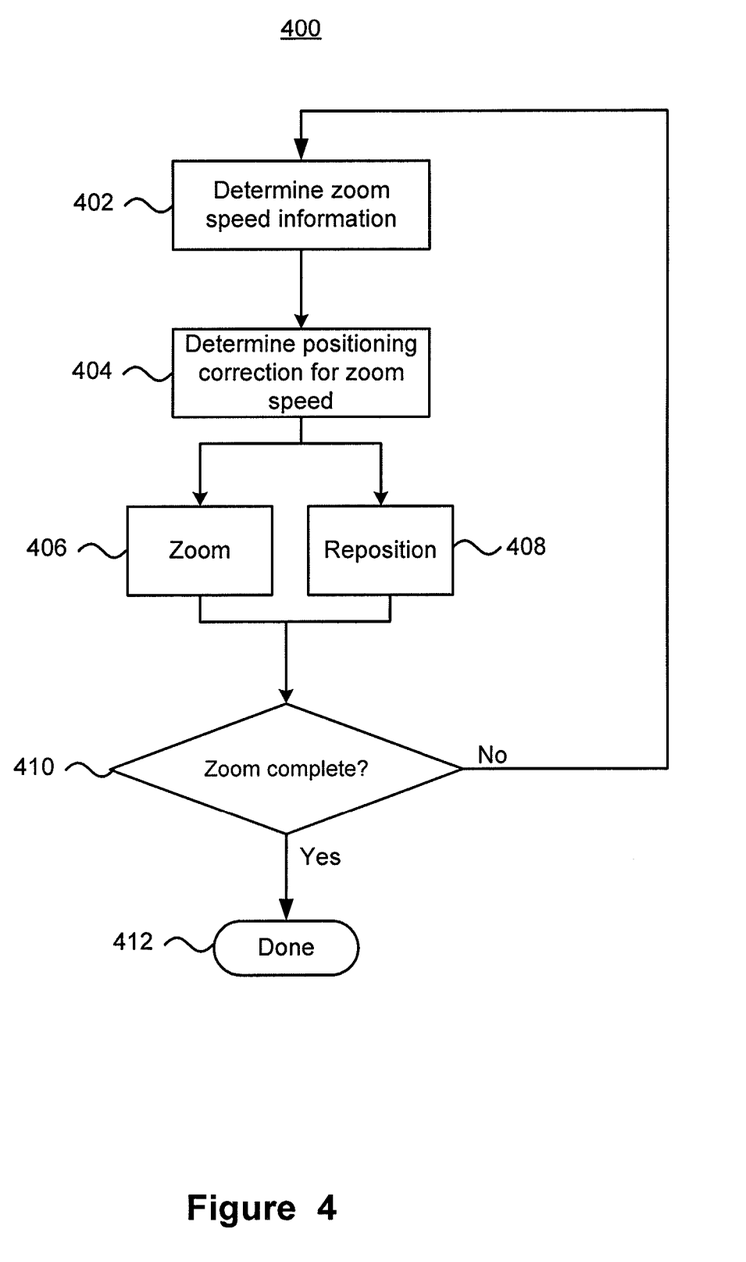
FIG. 4 depicts a method for correcting bore-sight offset error while zooming.

FIG. 4 depicts a method for correcting bore-sight offset error while zooming. The method 400 corrects for the bore-sight offset as the zoom movement occurs instead of after the zoom movement occurs. In order to correct for the bore-sight offset at the same time as zooming, the zoom speed of the camera system should be known so that the speed of the required compensation movements can be matched and result in a smooth zoom sequence. The method 400 determines zoom speed information for the zoom movement to be performed (402). The zoom movement to be performed may be specified in various ways. For example, a user may specify an area to zoom in on using a mouse or other pointing device. Alternatively, the zoom movement to be performed may be specified as an absolute value of the zoom ratio (i.e. magnification) or as a movement amount of the zoom ratio (i.e. change in magnification).

Additionally, a speed of the zoom movement to be performed may also be specified, which may act as a multiplier to the determined zoom speed. The zoom speed information may provide an indication of how movement of the zoom motors relates to the actual magnification amount. Movement of optical elements of a lens by a given amount will result in different magnification amount depending upon the starting position of the optical elements. As such, if the zoom motor controlling the position of the optical elements of the lens moves at a constant speed, the resultant speed of the zoom movement will not be constant and will depend upon the zoom position. The zoom speed information may be determined using a lookup table specifying the zoom speed for various zoom positions. The zoom speed information may be represented as a number of points relating zoom speed to zoom position. Once the zoom speed information is determined, a position correction of the displayed field of view required to correct for the bore-sight offset resulting from the zoom movement is determined (404). The positioning correction amount to correct for a given zoom movement may be determined for each camera system at the time of manufacture, or subsequent to manufacture. The positioning correction is in the opposite direction of the bore-sight offset. The determined positioning correction amount should be moved in the same amount of time the zoom movement takes, and as such a positioning correction speed may be determined to match the positioning correction to the zoom movement as it is performed. Once the positioning correction is determined for the zoom speed, the zoom movement (406) and the repositioning of the displayed field of view (408) can be performed at the same time. The zoom movement may be performed by putting a zoom motor in movement at a particular speed, which will continue its movement until it reaches the final zoom position As the zoom movement and repositioning are performed, it is determined if the zoom movement is complete (410) by checking to see if the current zoom position matches the target zoom position, and if it is (Yes at 410) the method is done (412). If the zoom movement is not complete (No at 410), the zoom speed information may be determined again (402). The zoom speed information may be determined based on the current zoom position and as such may vary as the zoom movement is performed. The zoom speed for a camera system may be represented in various ways, such as by a plurality of linear segments that approximate a non-linear zoom speed. Alternatively, the zoom speed may be represented by a closed form equation. If the zoom speed changes, the position correction is also determined again, and the speed at which the position correction occurs may be adjusted. The zoom movement (406) and reposition (408) continue, although the repositioning may occur at an updated positioning speed. The repositioning corrects for any bore-sight offset error as the error occurs, and since the positioning corrections are coordinated to match the zoom speed, the zoom movement does not produce jittery movements in the image.

Instead of detecting a zoom movement and compensating for the bore-sight offset afterwards, the positioning corrections of the displayed field of view are coordinated with the zoom movements from beginning to end of the zoom movement. All compensation is done as a continuous movement. In order to match the position correction movements with the zoom movement, the speed of the positioning correction, that is an amount the displayed field of view is moved in a given period of time, may be varied according to the non-linear zoom speed relative to the zoom position. The zoom speed information may be provided as a plurality of linear segments approximating the zoom speed between two zoom positions.

The amount of bore-sight offset is directly proportional to zoom magnification. Because the speed of zooming may change depending on zoom position, the rate of change in the bore-sight offset varies non-linearly when zooming. Since the bore-sight offset error is dependent upon the zoom level, the amount of correction required to be applied to the displayed field of view is also dependent upon the zoom level or magnification. The rate of change in magnification may have a non-linear relationship with the zoom motor position.

Figure 5:
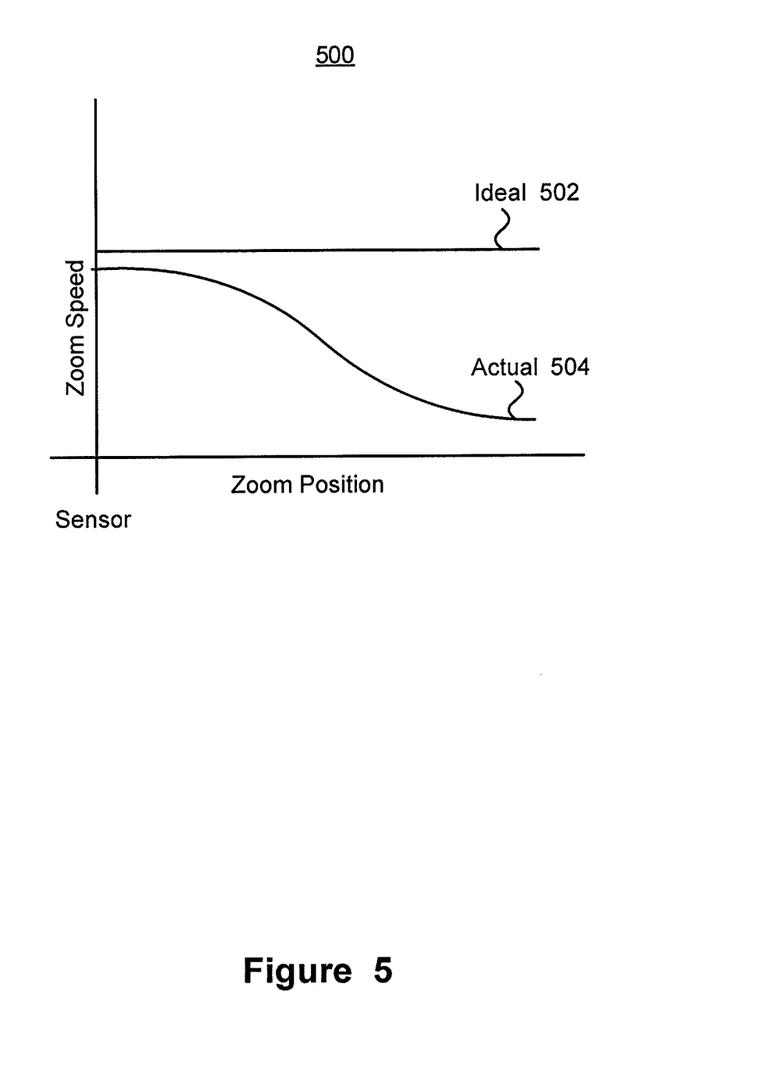
FIG. 5 is a graph depicting ideal and actual zoom speed versus zoom position.

FIG. 5 is a graph depicting ideal and actual zoom speed versus zoom position. As depicted by the graph 500, ideally the rate of change in magnification, also referred to as the zoom speed, is constant and does not vary based on the zoom position. The ideal zoom speed curve is depicted by horizontal line 502. The zoom speed curve of another camera system is depicted by the line 504, where the zoom speed varies with zoom position.

The zoom speed curve can be used to determine the rate of change in the bore-sight offset, which may be referred to as the bore-sighting speed, at a given zoom position. As depicted the zoom speed curve is non-linear. The bore-sighting speed is a function of the zoom speed, and as such may also be non-linear. It may be difficult to continuously determine and adjust the speed of the positioning corrections to match the non-linear bore-sighting speed. It is possible to provide acceptable results by converting the zoom speed curve to a piecewise linear curve. Each linear segment is positioned between two zoom positions, with the ending zoom position of a segment being the starting zoom position of a next segment. The approximated zoom speed provided by each linear segment may be treated as the zoom speed between the two zoom positions associated with the linear segment. If the positioning of the displayed field of view is controlled via positioning motors, each zoom position may be associated with a positioning motor offset required to correct for the bore-sight offset at that zoom position. In typical camera systems with pan and tilt motors, the pan and tilt motors are user moveable, and so as the zoom is being performed, the required positioning offset is applied to where the user has positioned the camera. As the positioning motor moves through positions associated with different linear segments of the zoom speed information, the positioning motor speed can be adjusted based on the zoom speed so that the rate of positioning correction matches the rate of change in bore-sight offset, or bore-sighting speed.

Figure 6:
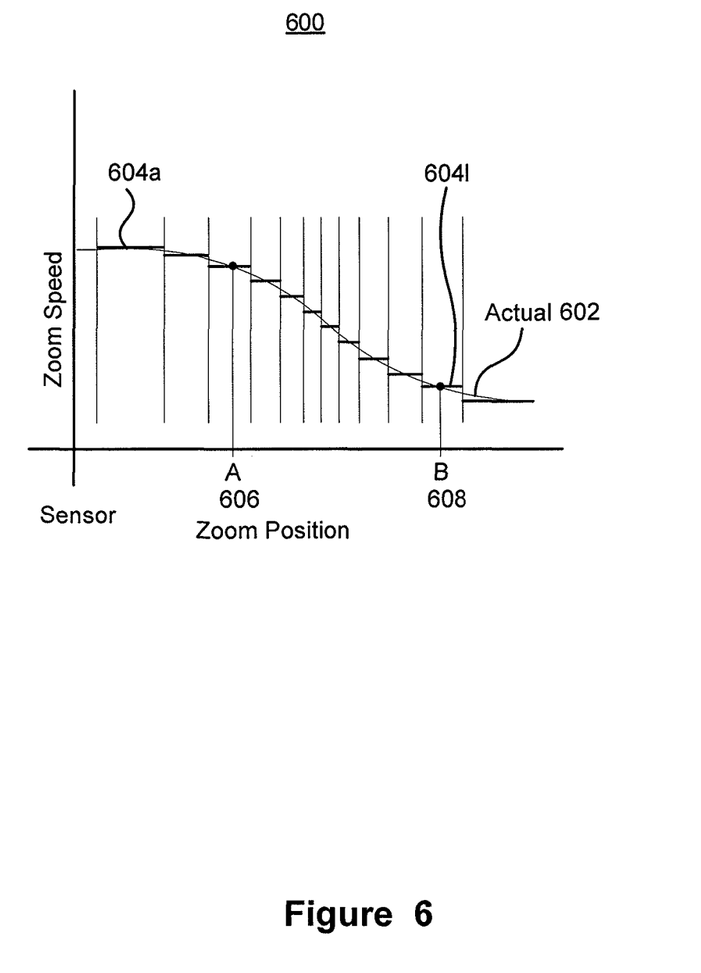
FIG. 6 is a graph depicting the linearization of the zoom speed curve.

FIG. 6 is a graph depicting the linearization of a zoom speed curve. The linearization may be performed using various techniques including, for example, the least squares technique. As depicted in the graph 600, the actual non-linear zoom motor speed curve 602 may be linearized into a number of individual linear segments 604a-604l (referred to collectively as segments 604). It is noted that only the first and last segments 604a, 604l are labeled. Each of the individual segments covers a portion of the actual zoom speed curve 602 and is associated with a continuous zoom position range. Further, each linear segment may be associated with a corresponding positioning correction required to correct a bore-sight offset. When a zoom movement requires moving the zoom motor from position A 606 to position B 608, the rate of change in magnification while performing the zoom movement can be approximated from of the individual segments used to linearize the zoom characteristic of the lens.

As the zoom motor is moved continuously from position A 606 to position B 608, in order to correct for bore-sight offset the displayed field of view should be moved continuously from a starting position to an ending position that moves the displayed field of view to correct for the bore-sight offset resulting from the change in magnification between point A and B. The speed at which the displayed field of view is moved should be adjusted during the zoom move so that it matches the speed of bore-sighting between positions A and B. When the zoom speed information is linearized as depicted in FIG. 6, the bore-sighting speed can be calculated for each segment and the positioning speed of the displayed field of view may be adjusted to match the bore-sighting speed based on the linear segment associated with the current zoom position. That is, the zoom position may be repeatedly checked while it is changing from point A to point B and the positioning speed can be updated when the zoom position moves to a new linear segment.

Figure 7:
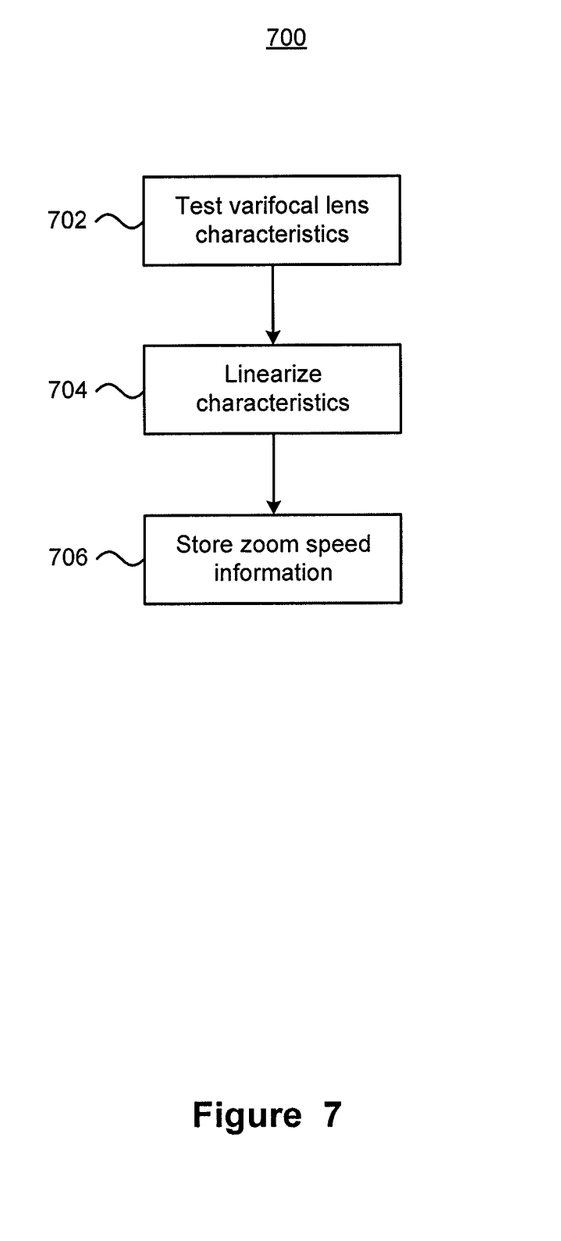
FIG. 7 depicts a method of creating zoom speed information.

FIG. 7 depicts a method of determining the zoom speed curve. A number of camera systems from the same product range may be tested in order to provide an average of the speed curve that can be used for all of the camera systems of the same product type. Once the speed curve for the zoom movement is determined it can be linearized (704). The number of segments used in the linearization may vary. For example, the number of segments may be from 3 to 10 or more. In one embodiment, 5 segments are used to linearize the non-linear zoom characteristic of the lens. Once the zoom speed curve has been linearized, zoom speed information may be stored in an appropriate format (706). For example, the zoom speed information may be stored in a lookup table or other data structure. Additionally or alternatively, the zoom speed information may be stored as a plurality of tuples of (zoom speed, zoom position) and the zoom speed for a particular zoom position can be interpolated from two of the tuples. Regardless of how the zoom speed information is stored, it may be subsequently used in correcting for bore-sight offset errors in a camera.

Figure 8:
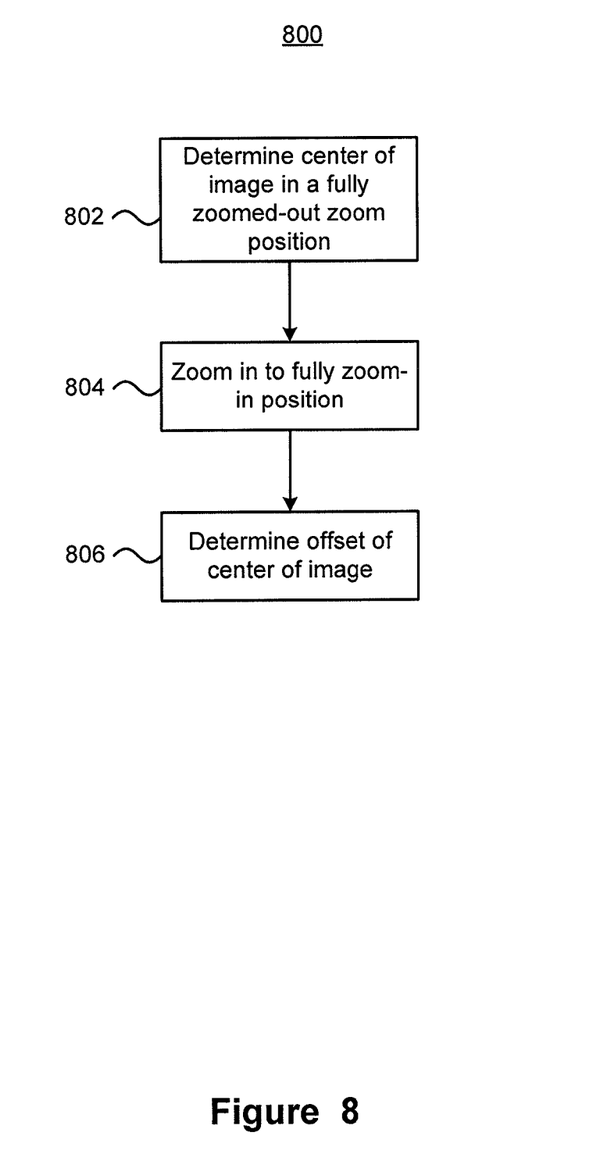
FIG. 8 depicts a method of determining the positioning correction required to correct for bore-sight offset.

FIG. 8 depicts a method of determining the positioning correction required to correct for bore-sight offset. As described above, the bore-sight offset error results from misalignment between the optical axis of a lens and the center of the image sensor. Accordingly, the bore-sight offset amount, and the positioning correction required to correct it, varies for each individual camera system. The method 800 for determining the positioning correction required to correct for the bore-sight offset may determine a center point, or other point or area suitable for tracking, of an image captured while lens is fully zoomed out (i.e. focal length is at its minimum) (802). The camera lens is then fully zoomed in (i.e. focal length is at its maximum) (804) and the positioning offset of the previously determined center point, or other tracked point or area, in the zoomed-in image as compared to the zoomed-out image is determined (806). Although described as using a center point of an image, it may be any point or area that can be tracked between the two images. A test image or pattern may be captured that provides convenient tracking points in order to determine the offset based on amount a tracked point has moved when the camera is zoomed in and out. The bore-sight offset has a linear relationship with magnification and can be determined from the positioning offset calculated based on the two focal length end points of the lens.

Figure 9:
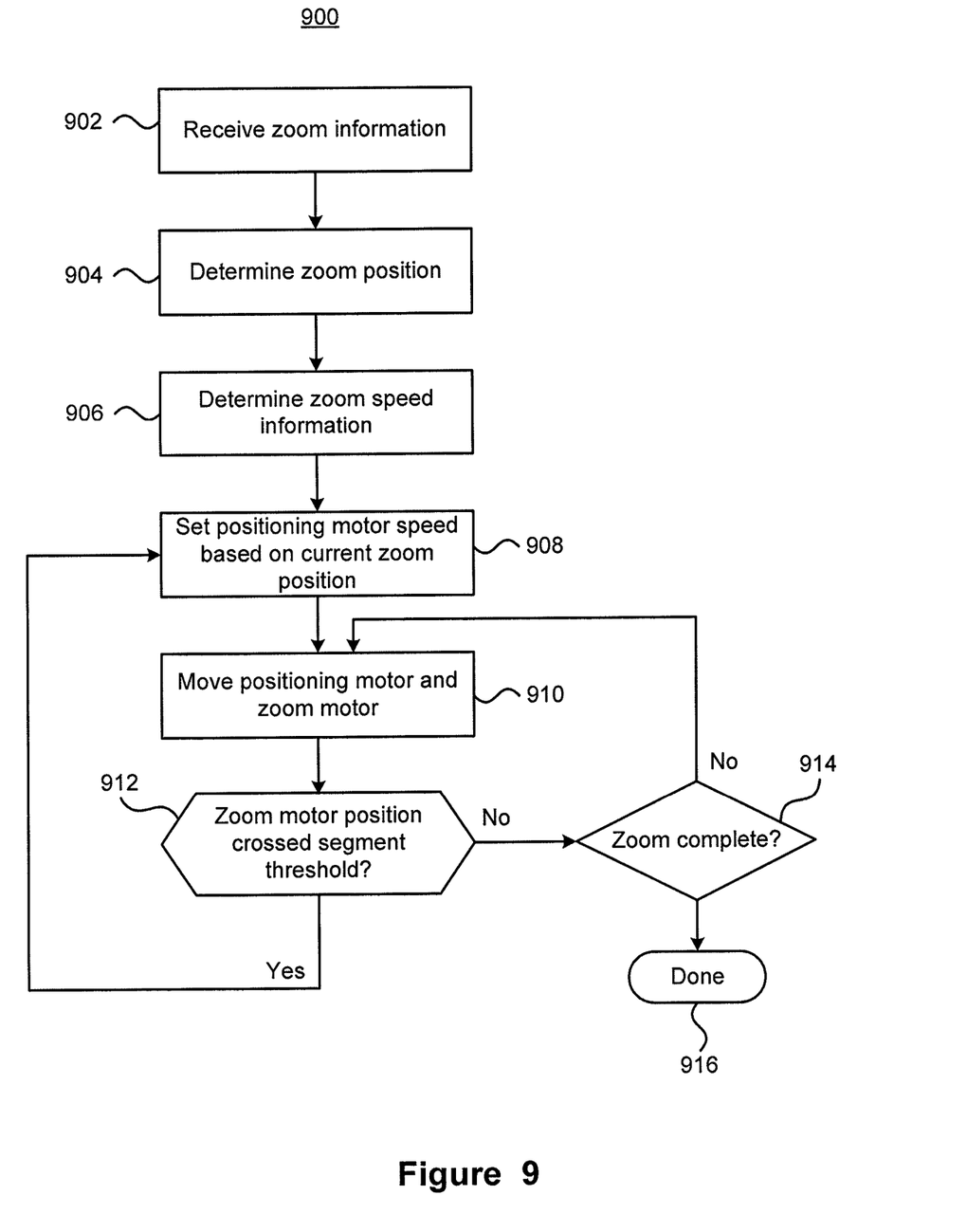
FIG. 9 depicts a further method for correcting bore-sight offset error while zooming.

FIG. 9 depicts an improved method for correcting bore-sight offset error while zooming. Zoom information is received (902) that is indicative of a zoom movement to be performed. The zoom movement may be specified in various ways. For example, the zoom information may specify a desired target zoom motor position. The target zoom motor position may be specified as an absolute position, such as a zoom movement to the fully wide position, or may be specified as a relative position, such as zoom out 50 motor steps. The zoom motor's current position is determined (904), for example depicted as position A 606 in FIG. 6. The target zoom position may also be determined, for example as position B 608 in FIG. 6. Zoom speed information is determined (906) and may be used to provide a schedule of positioning speed updates required to correct for the bore-sight offset. The positioning speeds may be specified in various ways, including a lookup table.

The initial positioning speed is set to the approximated speed of bore-sighting resulting from the zoom speed associated with current zoom position based on the linearized zoom speed curve (908). The zoom motor and the positioning motors are set in motion towards the target destination (910). As the zoom position changes, it is determined if the zoom position has crossed a position threshold and moved to a new linear segment (912). If the zoom motor position crossed a position threshold, indicating that the zoom speed should be approximated by another linear segment, the positioning speed is updated based on the zoom speed of the new segment to reflect the current bore-sighting speed (914). If the zoom position has not crossed a threshold (No at 912), it is determined if the zoom movement is complete (914) and if it is (Yes at 914) the method is finished (916) and the zoom motors will be at the required position to provide the desired magnification level and the positioning motors will be at the required position to correct for the bore-sight offset resulted from the change in magnification. If the zoom movement is not complete (No at 914) the movement of the positioning motors and zoom motor continues (910). The zoom motor is placed into movement once at the beginning of the zoom, and the speed of the positioning motors are adjusted throughout the zoom process. That is, movement commands may be issued to the zoom and positioning motors once, although the speed of the respective movement command to the motors may be altered over time.

By the time the zoom motor arrives at its final destination the positioning motors will have arrived at their destination since the speeds of the motors have been coordinated. The user experience of the zoom movement would be of a smooth, practically transparent zoom movement straight into the center of the original image. Although described with regard to changing the position of the displayed field of view through positioning motors, the displayed field of view may be moved by translating a Region Of Interest (ROI) within the image sensor space, if the ROI is smaller than the image sensor space.

Figure 10:
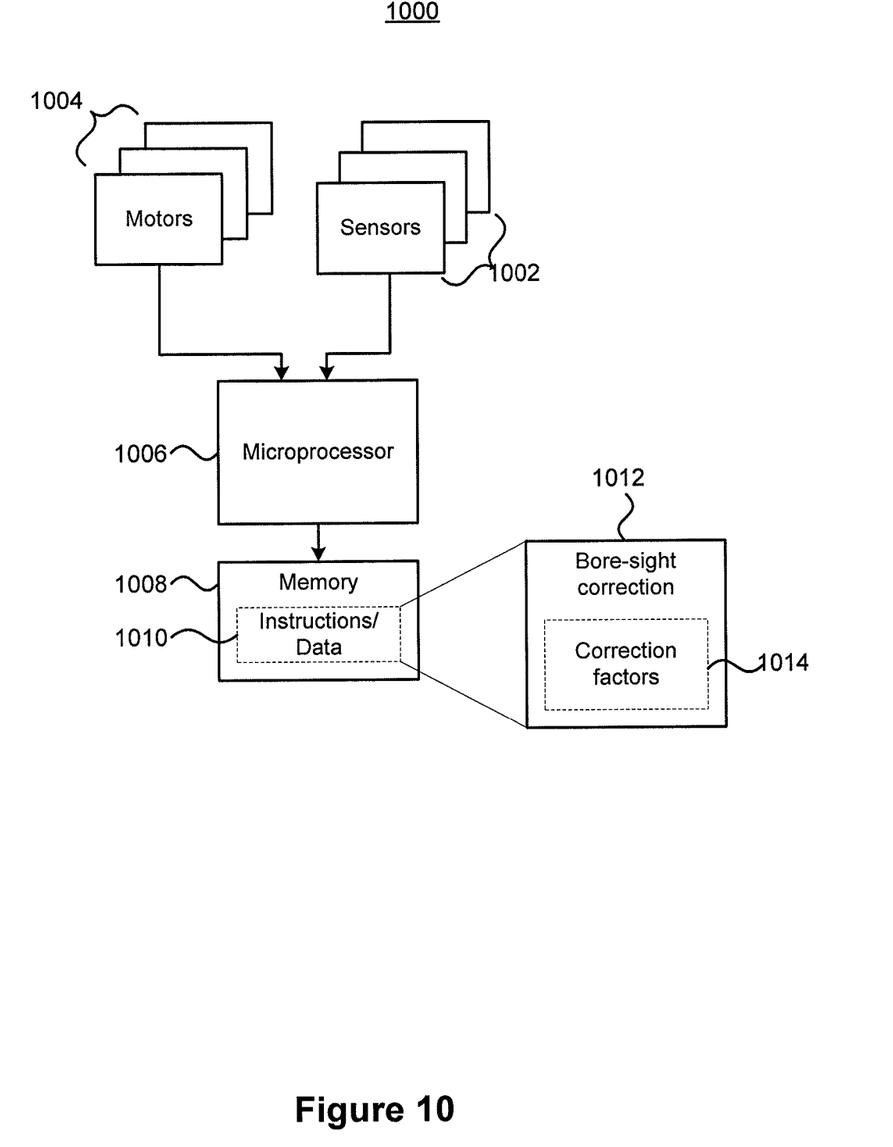
FIG. 10 depicts components of a camera system capable of correcting for bore-sight offset errors.

FIG. 10 depicts components of a camera system capable of correcting for bore-sight offset errors. The camera system 1000 comprises one or more sensors 1002. The sensors may include image sensors, as well as other sensors associated with the camera system, including light sensors, distance measuring sensors and other sensors for determining a position of the motors. The camera system 1000 may also comprise a number of motors 1004 including zoom motors for moving the position of lens elements as well as positioning motors for changing a direction the camera points. The sensors 1002 may include sensors for determining the position of motors. Alternatively, the motors themselves may provide positioning information or the positioning information may be determined based on the movements of the motors.

The camera system 1000 may further comprise a microprocessor 1006 for controlling operation of the camera system 1000. The microprocessor 1006 may execute instructions stored in memory 1008. The memory may store instructions 1010, which when executed by the microprocessor 1006 configure the camera system 1000 to provide functionality for correcting bore-sight offset errors 1012. The memory may also store data including correction factors 1014 associated with linear segments used to approximate the zoom speed.

Although the above discloses example methods, apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skills in the art will readily appreciate that the examples provided are not the only way to implement such method and apparatus. For example, the methods may be implemented in one or more pieces of computer hardware, including processors and microprocessors, Application Specific Integrated Circuits (ASICs) or other hardware components.

The present disclosure has described various systems and methods with regard to one or more embodiments. However, it will be apparent to persons skilled in the art that a number of variations and modifications can be made without departing from the teachings of the present disclosure.

What is claimed is:

1. A system comprising:
a control system configured to issue commands;
a camera system in communication with and physically separated from the control system, the camera system including:
a) a lens including optical elements;
b) an image sensor configured to capture images storable within the system; and
c) camera control apparatus configured to:
i. receive a zoom command from the control system to perform a zoom movement within the camera system;
ii. determine zoom speed information of the camera system; and
iii. move a displayed field of view of the camera system at a positioning speed based on the determined zoom speed information to correct for a bore-sight offset of the camera system as the zoom movement is performed in accordance with the zoom command.

2. The system of claim 1, wherein the zoom speed information provides an indication of a rate of change in magnification of the lens for zoom positions between a completely zoomed-out position and a completely zoomed-in position.

3. The system of claim 2, wherein the positioning speed is based on moving the displayed field of view a required amount to correct for the bore-sight offset while the zoom movement is performed.

4. The system of claim 2, wherein optical elements of the lens are configured to perform the zoom movement.

5. The system of claim 1, wherein the camera system further includes at least one positioning motor configured to effect adjustment of the position of the displayed field of view of the camera system.

6. The system of claim 5, wherein each zoom position is associated with a positioning motor offset required to correct for the bore-sight offset at the zoom position.

7. The system of claim 5, wherein the at least one positioning motor includes at least a pan motor and a tilt motor.

8. The system of claim 7, wherein the displayed field of view includes a region of interest in a larger field of view captured by the camera system, and wherein the displayed field of view of the camera is adjustable using a combination of the at least one positioning motor and translation of the region of interest within the larger field of view captured by the camera system.

9. The system of claim 1, wherein the position of the displayed field of view is adjusted to compensate for the bore-sight offset resulting from a zoom movement amount determined from the zoom command.

10. The system of claim 1, wherein the camera control apparatus is further configured to adjust the positioning speed at which the displayed field of view of the camera system is moved as the zoom movement is performed.

11. The system of claim 10, wherein the positioning speed is adjustable to match a current speed of the zoom movement based on the zoom speed information.

12. The system of claim 11, wherein the zoom speed information provides a plurality of linear segments approximating a non-linear relationship between zoom position and zoom speed.

13. The system of claim 11, wherein the zoom speed information provides a non-linear relationship between zoom position and zoom speed.

14. The system of claim 11, wherein each of the linear segments is associated with a corresponding positioning correction required to correct the bore-sight offset.

15. The system of claim 11, wherein the zoom speed information is represented as a closed form equation.

16. The system of claim 1, wherein the displayed field of view comprises a region of interest in a larger field of view capable of being captured.

17. The system of claim 1, wherein the camera system is in a location remote from the control system.

18. The system of claim 1, wherein the camera control apparatus is a processor.

19. A memory having stored thereon instructions for execution by a processor comprising part of a camera system, wherein the camera system also comprises a lens and an image sensor and wherein the instructions when executed by the processor cause the camera system to perform the following:
    receive zoom information for performing a zoom movement;
    determining zoom speed information of the camera system; and
    move a displayed field of view of the camera system at a positioning speed based on the determined zoom speed information to correct for a bore-sight offset of the camera system as the zoom movement is performed.

20. The memory of claim 19, wherein the zoom movement is performed by moving optical elements of a lens of the camera system.

21. The memory of claim 19, wherein the position of the displayed field of view of the camera system is adjusted using at least one positioning motor.

22. The memory of claim 21, wherein each zoom position is associated with a positioning motor offset required to correct for the bore-sight offset at the zoom position.

23. The memory of claim 21, wherein the at least one positioning motor comprises at least a pan motor and a tilt motor.

24. The memory of claim 23, wherein the displayed field of view comprises a region of interest in a larger field of view captured by the camera system, and wherein the displayed field of view of the camera is adjusted using a combination of the at least one positioning motor and translation of the region of interest within the larger field of view captured by the camera system.

25. The memory of claim 19, wherein the instructions when executed by the processor configure the camera system to adjust the positioning speed at which the displayed field of view of the camera system is moved as the zoom movement is performed.

26. The memory of claim 25, wherein the positioning speed is adjusted to match a current speed of the zoom movement based on the zoom speed information.

27. The memory of claim 26, wherein the zoom speed information provides a plurality of linear segments approximating a non-linear relationship between zoom position and zoom speed.

28. The memory of claim 27, wherein to adjust the positioning speed comprises the following:
    determining that a current zoom position is associated with a next linear segment of the zoom speed information;
    calculating a bore-sighting speed based on the zoom speed of the next linear segment and the bore-sight offset of the camera system; and
    adjusting the positioning speed to equal the bore-sighting speed to correct for the bore-sight offset.

29. The memory of claim 28, wherein to determine that the current zoom position is associated with the next linear segment comprises to determine that the current zoom position has crossed a position threshold indicating that the zoom speed should be approximated by the next linear segment.

30. The memory of claim 26, wherein each of the linear segments is associated with a corresponding positioning correction required to correct the bore-sight offset.

31. The memory of claim 26, wherein the zoom speed information is represented as a closed form equation.

* * * * *